United States Patent Office 3,256,161
Patented June 14, 1966

3,256,161
MANUFACTURE OF TETRAMETHYL LEAD
David G. Braithwaite, Chicago, Ill., assignor to Nalco Chemical Company, Chicago, Ill., a corporation of Delaware
No Drawing. Filed Dec. 31, 1964, Ser. No. 422,556
9 Claims. (Cl. 204—59)

This application is a continuation-in-part of my copending application U.S. Serial No. 93,327, filed March 6, 1961, now abandoned.

This invention relates to the preparation of tetramethyl lead.

In U.S. Patent 3,007,858, there is described a process for preparing alkyl lead compounds by electrolyzing a substantially anhydrous solution of a Grignard reagent in an organic solvent for the Grignard reagent, using a lead anode, and adding extraneous alkyl halide to the electrolyte. By the term "extraneous alkyl halide" is meant an alkyl halide in an amount which is in excess of that required to form a Grignard reagent from magnesium, ionsidering the formula of a Grignard reagent to be RMgX, where R represents the organic radial, Mg represents magnesium, and X represents a halogen atom, such as chlorine, bromine or iodine.

In carrying out this process for the manufacture of tetraethyl lead, the optimum results are obtained by employing fom 0.7 to 1.1 moles of extraneous ethyl chloride per mole of Grignard reagent. In other words, by using about 0.9 mole of extraneous ethyl chloride per mole of Grignard reagent excellent results are obtained in the manufacture of tetraethyl lead. If a smaller quantity of the ethyl chloride is employed the results obtained are less desirable, and if a larger quantity of ethyl chloride is used less desirable results are obtained, particularly due to the formation of hydrocarbons as a byproduct.

In accordance with the present invention it has been found that when a substantially anhydrous solution of a Grignard reagent in an organic solvent for the Grignard reagent is electrolyzed, using a lead anode, and adding extraneous methyl chloride to the electrolyte a different set of conditions should be employed in order to obtain the optimum results. Whereas ethyl chloride when used in the manufacture of tetraethyl lead produces good results at a concentration of 0.9 mole per mole of Grignard reagent, methyl chloride when used in the manufacture of tetramethyl lead with a methyl magnesium halide as the Grignard reagent results in the formation of an unusually large amount of gas at a concentration of 0.9 mole of methyl chloride per mole of methyl-Grignard reagent. It has now been found that the formation of these excess by-products can be greatly reduced by carrying out the process with at least 0.1 mole and less than 0.5 mole, of a methyl halide per mole of methyl-Grignard reagent. The term "methyl halide" as used herein means methyl chloride, methyl bromide and/or methyl iodide.

In other respects the conditions employed in the process are similar to the conditions used in the manufacture of tetraethyl lead. The cathode may be composed of a suitable conducting but non-reactive material, such as platinum, stainless steel, ordinary steel, graphite, or other conducting material, which does not dissolve in the electrolyte. In some cases the cathode may be composed of the same material as the anode. Thus, both the cathode and the anode can be composed of lead. It is preferable, however, that the anode be composed of lead and the cathode of steel.

The solvent for the Grignard reagent must be relatively inert under the conditions of the process. For this purpose it should not contain any labile hydrogen which is readily reactive. It may have some dielectric properties but it should have sufficient conductivity to permit the passage of a current between the anode and the cathode. Solvents containing aliphatic hydrocarbon groups connected to oxygen atoms or nitrogen atoms are especially useful. Low boiling solvents, such as, diethylether, can be employed but are difficult to handle and require special methods for the separation of the organic metallo compounds. Solvents, such as, tetrahydrofuran, can be employed. Examples of organic ether solvents are dimethylether, diethylether, and high molecular weight dialkylethers, including the ethers of polyoxyethylene glycols, polyoxypropylene glycols and polyoxyethylene-polyoxypropylene glycols which are liquid under the conditions of reaction. Special mention may be made of the dimethylether of diethylene glycol, the dipropylether of dipropylene glycol, the dibutylether of diethylene glycol and the dimethylether of dipropylene glycol. Examples of solvents containing nitrogen are trihexylamine, triamylamine, pyridine and quinoline.

The temperatures used are normally above the freezing point of the solution and below the boiling points of the solvent and tetramethyl lead. In general, it is preferable to use temperatures within the range of 20° C. to 50° C.

The pressures used are normally sufficient to maintain the liquid phase with the particular solvent and temperature conditions employed. Since methyl chloride is a gas it is preferable to operate the process under superatmospheric pressures which usually do not exceed five atmospheres.

One way of carrying out the process is to electrolyze the electrolyte until the Grignard reagent therein is substantially exhausted. Another way is to separate a part of the electrolyte and recover at least a part of the desired product, thereafter returning separated solvent and also Grignard reagent to the cell. The present invention is not particularly concerned with the manner in which the product is recovered.

The invention will be further illustrated but is not limited by the following examples in which the quantities are stated in parts by weight unless otherwise indicated.

*Example 1*

The cell used was a pipe cell made from a 2 inch diameter steel pipe about 30 inches long with ½ inch flange openings welded on opposite sides of the pipe 24 inches apart to form inlet and outlet openings for introducing and withdrawing the electrolyte. The center of the bottom inlet opening was about 2 inches from the bottom of the cell and the center of the top outlet opening was about 4 inches from the top of the cell. A layer of fine mesh woven polypropylene filaments was used as a liner on the inside of the pipe to separate the cathode from lead pellets which formed the anode material. A lead rod was inserted into the center of the cell longitudinally and connected to a positive source of electricity. A negative source of electricity was connected to the outside of the pipe so that the pipe itself formed the cathode. The area of the cathode was approximately 92 square inches. The area of the screening was approximately 84.25 square inches. The available volume within the cell was approximately 18.65 cubic inches. The cell was charged with lead pellets.

The methyl-Grignard solution was prepared by reacting methyl chloride and metallic magnesium in the dibutylether of diethylene glycol in proportions of approximately one mole of methyl chloride per mole of metallic magnesium per mole of said ether. A total of 3211 grams of this Grignard reagent was mixed with 976 grams of tetrahydrofuran and 346 grams of methyl chloride to give the initial electrolyte. The solution was recirculated externally of the cell through a heat exchanger at an average flow rate of 1.5 gallons per minute until a temperature of 38° C. was obtained. Methyl chloride was added each hour during the run in order to maintain approximately the initial methyl chloride concentration and for this purpose 278 grams of methyl chloride were added. The initial Grignard concentration was 1.82 millimoles per gram of solution. The initial methyl chloride concentration was 0.88 mole per mole of Grignard. The initial tetrahydrofuran concentration was 1.80 mole per mole of Grignard. A small amount of benzene was also added initially in the system, the amount being 0.24 mole per mole of Grignard. The average voltage during the run was 27.1 and the average amperage 9.8. The run was carried out for 166.8 ampere hours. The current efficiency was 127%. The average current at 30 volts was 11.3 amperes.

The Grignard conversion was 89.1%. The yield of tetramethyl lead based on the Grignard reagent was 61.4%. The gas make was 43%. The yield of tetramethyl lead based upon magnesium was 47.4%. The molar ratio of ethane and methane in the gases was 8.13. The average temperature during the run was 37.7° C. The average pressure was 19.2 p.s.i.g.

This example shows that with a concentration of 0.88 mole of methyl chloride per mole Grignard reagent, the gas make was relatively high, the yields were relatively low and the current efficiency was less than expected.

*Example II*

The procedure was similar to that in Example I except that the concentration of methyl chloride was 0.12 mole per mole of Grignard. The average temperature was 29.2° C. The average pressure was 2.9 p.s.i.g. The average recirculation of the electrolyte was 4.8 gallons per minute. The Grignard concentration was 2.25 millimoles per gram of solution. The concentration of tetrahydrofuran was 1.09 moles per mole of Grignard. The concentration of benzene was 0.19 mole per mole of Grignard.

The average voltage during the run was 27.6. The average current was 5.8 amperes of direct current. The total number of ampere hours was 204.3 and the current efficiency was 145%.

The Grignard conversion was 88.9%. The yield of tetramethyl lead, based on the Grignard, was 90.3%. The gas make was 2.94%. The yield of tetramethyl lead, based on magnesium, was 75.1%. The molar ratio of ethane to methane in the gases produced as by-products was 1.

The results of this run when compared with those of Example I showed that the lower concentration of extraneous methyl chloride greatly reduced the formation of by-product gases and increased the yield of tetramethyl lead, as well as the current efficiency.

*Example III*

The procedure was the same as Example I except that the concentration of extraneous methyl chloride was 0.36 mole per mole of Grignard reagent. The temperature used was 42.8° C. The average pressure was 7.6 p.s.i.g. The average rate of flow of the electrolyte was 4 gallons per minute.

The Grignard concentration was 1.67 millimoles per gram of solution. The concentration of tetrahydrofuran was 1.09 moles per mole of Grignard. The concentration of benzene was 3.13 moles per mole of Grignard.

The average voltage was 27.2. The average current was 14.1 amperes of direct current. The total ampere hours was 219.6. The current efficiency was 143%.

The Grignard conversion was 83.3%. The yield of tetramethyl lead was 91.3%. The gas make was 3.58%. The yield of tetramethyl lead, based on magnesium, was 73.8%. The molar ratio of ethane to methane in the by-product gases was 0.27.

*Example IV*

The procedure was the same as in Example I except that a methyl chloride concentration of 0.29 mole per mole of Grignard reagent was used. The average temperature was 29.9° C. The average pressure was 3.4 p.s.i.g. The average rate of flow of the electrolyte was 4 gallons per minute.

The concentration of Grignard reagent was 1.61 millimoles per gram of solution. The concentration of tetrahydrofuran was 0.75 mole per mole of Grignard. The benzene concentration was 1.93 moles per mole of Grignard.

The average voltage was 27.2. The average current was 9.8 amperes of direct current. The total ampere hours was 194.8. The current efficiency was 149%.

The grignard conversion was 88.9%. The yield of tetramethyl lead was 92.1%. The gas make was 1.26%. The yield of tetramethyl lead, based on magnesium, was 81.2%. The molar ratio of ethane to methane was 0.38 in the by-product gases.

*Example V*

The procedure was the same as in Example I except that a methyl chloride concentration of 0.30 mole per mole of Grignard was used. The average temperature was 40.9° C. The average pressure was 5 p.s.i.g. The average rate of flow of the electrolyte was 4 gallons per minute.

The initial Grignard concentration was 1.58 millimoles per gram of solution. The initial concentration of tetrahydrofuran was 0.75 mole per mole of Grignard. The initial concentration of benzene was 1.93 moles per mole of Grignard.

The average voltage over the run was 28.1 volts. The average current during the run was 15.6 amperes of direct current. The total ampere hours was 202.6. The current efficiency was 158%.

The Grignard conversion was 90.4%. The yield of tetramethyl lead, based in the Grignard converted, was 97.0%. The gas make was 1.53%. The yield of tetramethyl lead, based on the magnesium, was 87.5%. The molar ratio of ethane to methane was 0.34.

From the foregoing examples it will be seen that especially good results are obtained where the molar ratio of methyl chloride to methyl-Grignard reagent is at least 0.3 but less than 0.5. An optimum ratio is 0.45.

The foregoing examples illustrate that the optimum conditions for preparing tetramethyl lead are different with respect to the amount of organic halide used than the optimum conditions for preparing tetraethyl lead. In fact, the conditions which give the best results in the preparation of tetraethyl lead give relatively poor results in the prepartion of tetramethyl lead, particularly in the formation of relatively large amounts of by-product gases. This invention, therefore, represents an improvement in the process of preparing tetramethyl lead.

It will be recognized that various methods, including fractional distillation, vacuum distillation and steam distillation, may be employed in recovering the products. The present invention is not concerned with the particular manner in which the products are recoveerd nor is it concerned with the particular solvents used for the Grignard reagent. Furthermore, the critical point of the invention does not lie in the particular voltages or amperages used. These may vary within relatively wide limits. Thus, the voltages are usually within the ranges of 2 to 35 volts and the current requirements are normally within the range of 2 amperes to 30 amperes. The current density will usually vary within the range of about 2 amperes per square foot to 30 amperes per square foot. The optimum current density will vary somewhat depending upon the temperature. In general, the higher the temperature used, the higher the current density. The temperatures of 30° C., 35° C., 40° C., 45° C. and 50° C. have been used with satisfactory results. The optimum current density at 30° C. is around 22 and 25 amperes per square foot. At 50° C. it is around 30 amperes per square foot and at 40° C. around 25 to 30 amperes per square foot.

In the examples, tetrahydrofuran has been added because it has been found that this addition increases the conductivity initially and shortens the run. This results in less gas formation due to the shorter run. However, the process may be carried out without tetrahydrofuran. Where tetrahydrofuran is employed it is preferable to use about 0.5 to 1.5 moles per mole of Grignard reagent. Higher concentrations appear to produce side reactions or side physical effects which are undesirable.

In carrying out the process the initial Grignard concentration is subject to wide variation but is preferably within the range of 0.5 to 2.5 millimoles per gram of solution and the best results have been obtained by Grignard concentrations of about 1.3 to 1.4 millimoles of Grignard per gram of solution.

The use of benzene is also optional but desirable. The benzene concentration should be sufficient to increase the conductance of the solution and preferably sufficient to produce a single liquid phase product. The best results have been obtained by employing from about 3 to 7.5 moles of benzene per mole of Grignard, preferably 4 to 5 moles per mole of Grignard. Where both tetrahydrofuran and benzene are employed, it is preferable to use an amount within the weight ratio of 1:4 to 1:7. As previously indicated, however, the present invention is based on the discovery of a specific relationship between the amount of methyl halide and the amount of Grignard required to produce optimum results.

The invention is hereby claimed as follows:

1. A process for preparing tetramethyl lead which comprises electrolyzing, using a lead anode, a substantially anhydrous solution of a methyl-Grignard reagent in a substantially inert solvent for said Grignard reagent, and adding extraneous methyl halide to said solution, while maintaining a molar ratio of said methyl halide to said methyl-Grignard reagent within the range of at least 0.1 but less than 0.5.

2. A process for preparing tetramethyl lead which comprises electrolyzing, using a lead anode, a substantially anhydrous solution of a methyl-Grignard reagent in a substantially inert solvent for said Grignard reagent, and adding extraneous methyl halide to said solution, while maintaining a molar ratio of said methyl halide to said methyl-Grignard reagent within the range of at least 0.3 but less than 0.5.

3. A process for preparing tetramethyl lead which comprises electrolyzing, using a lead anode, a substantially anhydrous solution of a methyl-Grignard reagent in a substantially inert solvent for said Grignard reagent, and adding extraneous methyl halide to said solution, while maintaining a molar ratio of said methyl halide to said methyl-Grignard reagent of about 0.45.

4. A process for preparing tetramethyl lead which comprises electrolyzing, using a lead anode, a substantially anhydrous solution of methyl magnesium chloride in a substantially inert solvent for said methyl magnesium chloride, and adding extraneous methyl chloride to said solution, while maintaining a molar ratio of said methyl chloride to said methyl magnesium chloride within the range of at least 0.1 but less than 0.5.

5. A process for preparing tetramethyl lead which comprises electrolyzing, using a lead anode, a substantially anhydrous solution of methyl magnesium chloride in a substantially inert solvent for said methyl magnesium chloride, and adding extraneous methyl chloride to said solution, while maintaining a molar ratio of said methyl chloride to said methyl magnesium chloride within the range of at least 0.3 but less than 0.5.

6. A process for preparing tetramethyl lead which comprises electrolyzing, using a lead anode, a substantially anhydrous solution of methyl magnesium chloride in a substantially inert solvent for said methyl magnesium chloride, and adding extraneous methyl chloride to said solution, while maintaining a molar ratio of said methyl chloride to said methyl magnesium chloride of about 0.45.

7. An electrolyte for preparing organic lead compounds by electrolyzing a lead anode, comprising a methyl Grignard reagent and at least 0.1 but less than 0.5 mole of a methyl halide per mole of methyl Grignard reagent dissolved in an inert, anhydrous organic solvent.

8. An electrolyte for preparing organic lead compounds by electrolyzing a lead anode, comprising methyl magnesium chloride and at least 0.1 but less than 0.5 mole of methyl chloride per mole of methyl magnesium chloride dissolved in an inert, anhydrous organic solvent.

9. An electrolyte for preparing organic lead compounds by electrolyzing a lead anode, comprising methyl magnesium chloride, 0.5 to 1.5 moles of tetrahydrofuran per mole of methyl magnesium chloride, a liquid dialkylether of a polyethylene glycol and at least 0.1 but less than 0.5 mole of methyl chloride per mole of methyl magnesium chloride, the concentration of methyl magnesium chloride being within the range of 0.5 to 2.5 millimoles per gram of solution.

References Cited by the Examiner

UNITED STATES PATENTS 3,118,825 1/1964 Linsk et al. _____ 204—59
3,155,602 11/1964 Linsk et al. _____ 204—59

JOHN. H. MACK, *Primary Examiner.*

H. S. WILLIAMS, *Assistant Examiner.*